United States Patent
Pollet

(10) Patent No.: US 11,333,027 B2
(45) Date of Patent: May 17, 2022

(54) VIBRATION DAMPER FOR A TURBOMACHINE ROTOR VANE

(71) Applicant: SAFRAN HELICOPTER ENGINES, Bordes (FR)

(72) Inventor: Laetitia Pollet, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 8 days.

(21) Appl. No.: 16/771,048

(22) PCT Filed: Dec. 12, 2017

(86) PCT No.: PCT/FR2017/053529
§ 371 (c)(1),
(2) Date: Jun. 9, 2020

(87) PCT Pub. No.: WO2019/115886
PCT Pub. Date: Jun. 20, 2019

(65) Prior Publication Data
US 2021/0180460 A1    Jun. 17, 2021

(51) Int. Cl.
| | |
|---|---|
| F01D 5/26 | (2006.01) |
| F01D 5/16 | (2006.01) |
| F01D 5/22 | (2006.01) |
| F01D 5/30 | (2006.01) |
| F01D 25/06 | (2006.01) |

(Continued)

(52) U.S. Cl.
CPC ............ *F01D 5/26* (2013.01); *F05D 2220/30* (2013.01)

(58) Field of Classification Search
CPC ..... F01D 5/16; F01D 5/22; F01D 5/10; F01D 5/26; F01D 5/027; F01D 5/30; F01D 5/3007; F01D 11/006; F01D 11/008; F01D 25/06; F05D 2220/30; F05D 2260/96; F04D 29/324; F04D 29/668; F04D 29/338; B22F 5/009; B22F 5/04; B22F 7/00

See application file for complete search history.

(56) References Cited

U.S. PATENT DOCUMENTS 2,877,980 A * 3/1959 Stalker ...................... F01D 5/26
                                                        416/190

FOREIGN PATENT DOCUMENTS

| DE | 102010046579 A1 | 3/2012 |
| DE | 102016204255 A1 | 9/2017 |
| EP | 3054103 A1 | 8/2016 |

(Continued)

OTHER PUBLICATIONS

Machine Translation of DE102016204255A1 [retrieved on Aug. 12, 2021], Retrieved from: Espacenet. (Year: 2021).*

(Continued)

*Primary Examiner* — Eric J Zamora Alvarez
(74) *Attorney, Agent, or Firm* — Christensen O'Connor Johnson Kindness PLLC

(57) ABSTRACT

A turbomachine rotor has a disk carrying vanes, each vane having a blade linked by a platform to a root. For at least one vane, a recess is defined between the platform and the disk, and a vibration damper is mounted in the recess. The vibration damper includes a first structural portion configured to contact the platform of which the vibrations are to be dampened, and a second mass portion configured to dampen these vibrations. The second mass portion is a powder and the first structural portion is a box containing the powder.

22 Claims, 4 Drawing Sheets

(51) Int. Cl.
*F01D 5/10* (2006.01)
*F16F 7/01* (2006.01)

(56) References Cited

FOREIGN PATENT DOCUMENTS

FR 2998497 A1 5/2014
FR 3029829 A1 6/2016

OTHER PUBLICATIONS

Written Opinion of the International Searching Authority dated Apr. 2, 2020, issued in corresponding International Application No. PCT/FR2017/053529, filed Dec. 12, 2017, 7 pages.
International Preliminary Report on Patentability dated Jun. 16, 2020, issued in corresponding International Application No. PCT/FR2017/053529, filed Dec. 12, 2017, 7 pages.
International Search Report dated Aug. 6, 2018, issued in corresponding International Application No. PCT/FR2017/053529, filed Dec. 12, 2017, 7 pages.
Written Opinion of the International Searching Authority dated Aug. 6, 2018, issued in corresponding International Application No. PCT/FR2017/053529, filed Dec. 12, 2017, 6 pages.

* cited by examiner

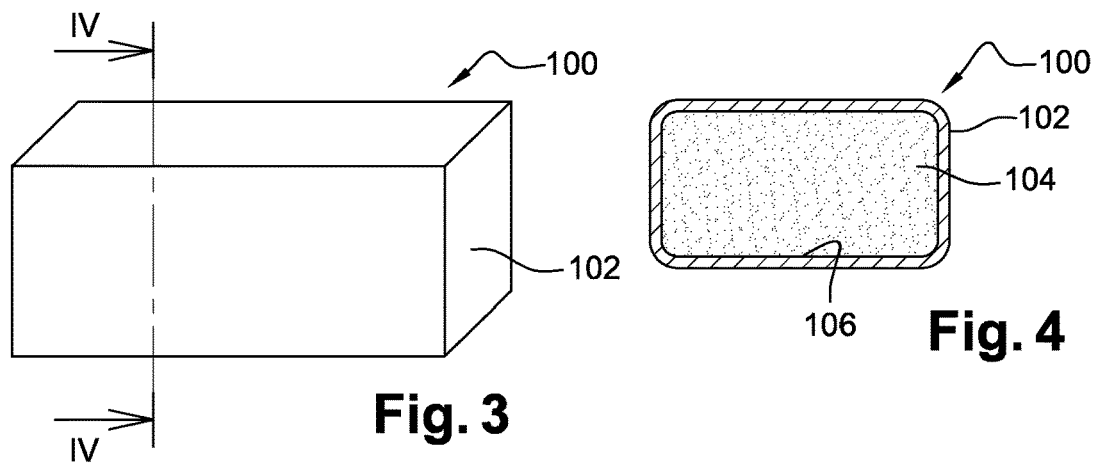
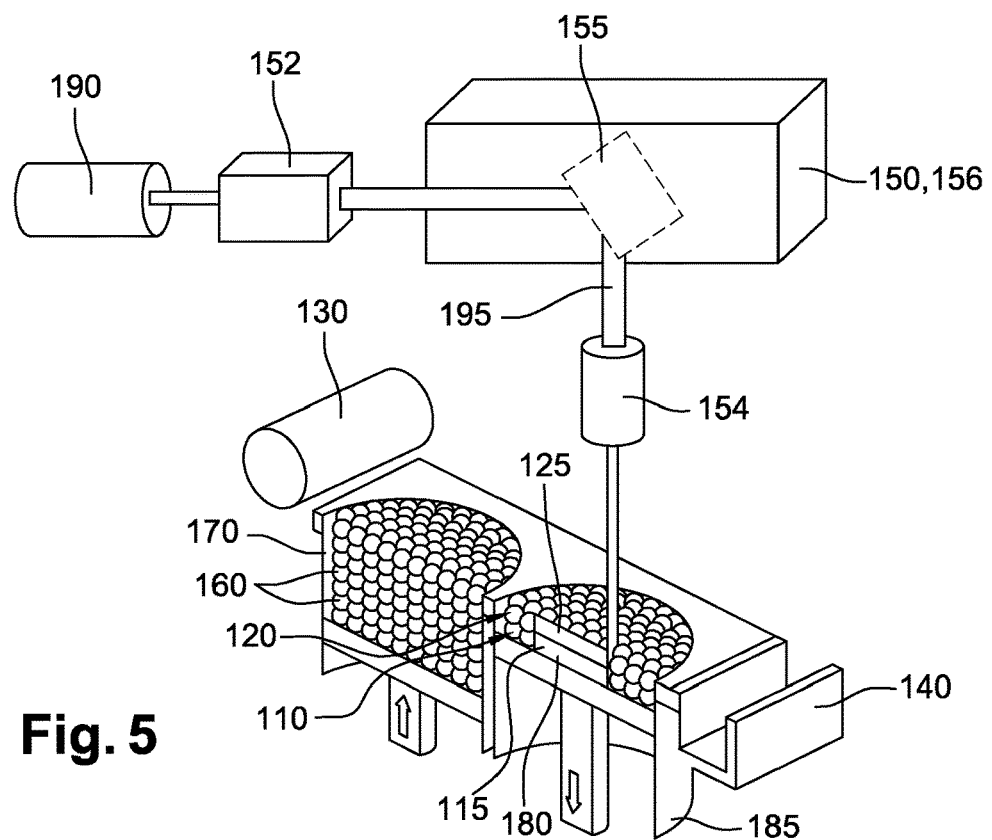
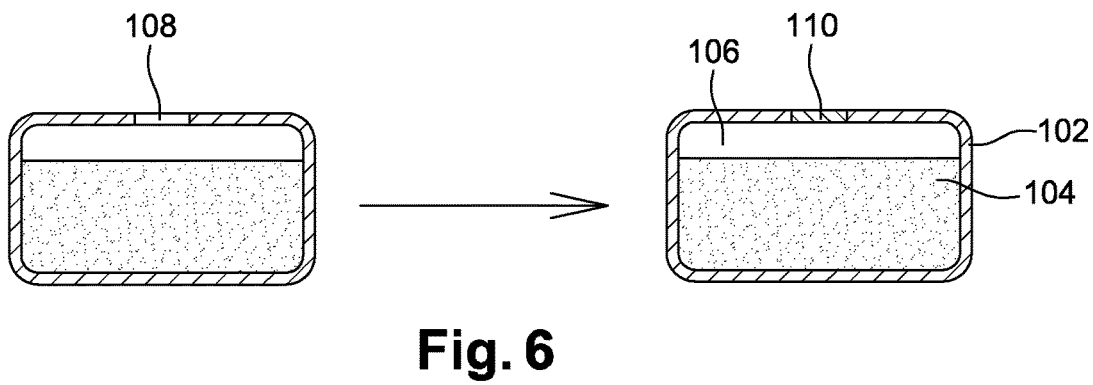

VIBRATION DAMPER FOR A TURBOMACHINE ROTOR VANE

TECHNICAL FIELD

The invention relates in particular to a vibration damper, especially for a turbomachine rotor vane. The invention applies in particular to the turbine rotors for turbomachines, but can also be applied to the fans or low-pressure compressors with attached vanes.

BACKGROUND

A turbomachine comprises at least one turbine for driving a compressor, which delivers compressed air to the inlet of the combustion chamber. The vanes of the rotors constituting the stages of the turbine undergo a significant temperature rise by contact with the hot gases leaving the combustion chamber after combustion. The hot gases then circulate in a duct channeled by an annular pipe, and drive in rotation the vanes of the rotors of the turbine arranged in this duct.

The vanes and the periphery of the disks on which they are arranged therefore require an energetic cooling. The cooling air comes from the outside and/or from a fraction of the air of a compressor stage associated with a turbine stage. An air circulation around the disks also allows to cool the surfaces thereof.

An attached vane generally comprises a blade linked by a platform to a root, this root being for example of the fir tree or dovetail type and being intended to be engaged by fitting into a complementary shaped socket on the periphery of a disk. The platforms of the vanes form the internal meridian of the air duct at the rotor.

The presence of the aforementioned gas flows and the dynamic excitation of the rotation of the vanes create vibration phenomena. In order to limit these vibrations, the vanes are equipped with vibration dampers of the friction type which are supported under the platforms thereof.

These vibration dampers are generally in the form of small stamped sheets with more or less pronounced fallen edges, and the energy generated by the movement of the blades and the vibrating platforms is dissipated by the friction of these sheets against the platforms. In their movements, the sheets are pressed against the platforms by the centrifugal forces, the friction phenomenon alternating between sliding phases and phases of adhesion to the platforms. The better the fit between the vibration damper and the platform, the better the damping. Such friction elastic vibration dampers are described for example in the document FR-A1-2 503 247.

The thickness of the sheet, in the range of 0.2 to 1 mm, is selected according to the vibration conditions of the blade and the dynamic excitation it may experience, especially with regard to its resonance speeds. An optimum mass is defined to damp a precise resonance of each vibratory context, taking into account the type of turbine resonance as well as the turbine rotational speed range and other design criteria (geometry, material, etc.). In particular, in the case of slow turbines or low pressure air flows, the optimum mass is significantly higher than that of fast turbines.

Thus, in the powerful turbomachines with multi-stage free turbine, with low mechanical loads, the speeds of so-called slow turbines (below 30,000 rpm) are significantly lower than the faster speeds of single-stage turbines (approx. 35 to 45,000 rpm). In addition, the two-stage turbines have more slender and more numerous blades (for example from 40 to 60 blades), and therefore less interplatform space between these blades.

It is therefore becoming increasingly difficult to reach the optimum mass with this technology and thus to control the friction forces. Moreover, the use of thicker sheet to achieve a high optimal mass, for example more than 1 mm, when the recess cavities allow it, hinders the energy dissipation and the flexibility of the sheet, i.e. its capacity to deform under centrifugal field, and therefore its friction quality and vibration dissipation. The formation of very localised wear points under the platforms then confirms the poor distribution of the contact areas between the vibration dampers and the platforms.

Under these conditions, an incompatibility can be noted between the respect of the optimal mass which, defined by the vibratory context, tends to increase in a general way with regard to slow turbines and the flexibility of the vibration damper as well as its friction quality. Indeed, the use of thicker and thicker sheets, housed in reduced spaces between platforms in the case of slow turbines, leads to a degradation of the flexibility of the vibration damper and adaptation to the vane/damper contact and therefore of the induced damping.

The Applicant thus sought to remove this incompatibility by providing vibration dampers of optimum mass capable of damping a resonance according to the vibratory context of the turbine, in particular for slow turbines, while at the same time favouring a flexibility of adaptation to the bearing surfaces of the recesses of the vibration dampers. For this purpose, the invention provides for separating the functions of mass and flexibility.

A solution in this sense has already been proposed in the document FR-A1-2 970 033, which describes a method of damping blades mounted on gas turbine slow-wheel disks, the turbine having recesses under blade platforms suitable for receiving vibration dampers. The method consists in independently producing a structural and plating portion against the platform and a mass concentration portion of the forces for the control of the friction forces against the platform via the plating, coupling the two portions together in a reversible way and inserting the vibration dampers thus constituted in two portions in the dedicated recesses.

The coupling of the two portions is formed by at least partially enveloping the mass portion by at least one area of plating of the flexible portion against the platform. The flexible portion is sufficiently flexible to adapt to the required level of contact, for example to compensate for imperfect positioning, to adapt to the dispersion of geometries under the platform from blade to blade or to neutralize metal casting tolerances. The mass portion can be changed by another mass of different material or can be increased by adding an additional mass in case of a damping deficit.

This invention proposes an improvement of the technology.

DISCLOSURE OF THE INVENTION

The invention provides a turbomachine rotor, comprising a disk carrying vanes, each vane comprising a blade connected by a platform to a root, recesses being defined between the platforms of the vanes and the disk, and vibration dampers being mounted in at least some of said recesses, each vibration damper comprising a first structural portion configured to be in contact with a platform of which the vibrations are to be dampened, and a second mass portion configured to carry out a function of damping these vibrations, characterised in that the second mass portion is in the form of a powder and the first structural portion is in the form of a box containing said powder.

The solution therefore consists of a boxed vibration damper containing the powder. This is advantageous because the enclosed powder volume is adjusted to reach a predetermined mass without participating in the stiffness of the vibration damper.

The rotor according to the invention may comprise one or more of the following features taken in isolation from each other or in combination with each other:
- the box is closed in a sealed manner to prevent the powder from unintentionally escaping from said box;
- the powder occupies the entirety of the internal volume of said box;
- the powder occupies only a portion of the internal volume of said box;
- the box has a substantially parallelepipedic general shape,
- the box and the powder are made of the same metallic material,
- the box is obtained by melting a powder identical to that contained in the box.
- the box comprises fallen edges to ensure that it remains in its recess when the motor is stopped (i.e. centrifugal forces are cancelled).

This invention also relates to a method for producing a vibration damper as described above, in which it comprises a step of producing said box by additive manufacturing by selective melting on powder beds, the powder contained in the box being that used to manufacture the box.

The box can be entirely produced and closed in a sealed manner by additive manufacturing and contains a volume of powder substantially equal to the internal volume of the box. In an alternative embodiment, the box is made by additive manufacturing with at least one opening which is used to discharge some of the powder contained in the box and which is then closed in a sealed manner, for example by welding.

BRIEF DESCRIPTION OF THE FIGURES

Other features and advantages of the invention will be apparent from the detailed description of examples of embodiments of the invention below, with reference to the annexed figures which represent, respectively:

FIG. 3 is a schematic perspective view of a vibration damper according to the invention, FIG. 4 is a schematic cross-sectional view along line IV-IV of FIG. 3;

FIG. 5 is a very schematic view of a machine for producing a vibration damper according to the invention, by additive manufacturing, FIG. 6 comprises schematic cross-sectional views similar to that of FIG. 4 and illustrates an embodiment of method for producing this vibration damper;

DETAILED DESCRIPTION OF AN EMBODIMENT

Figure 1:
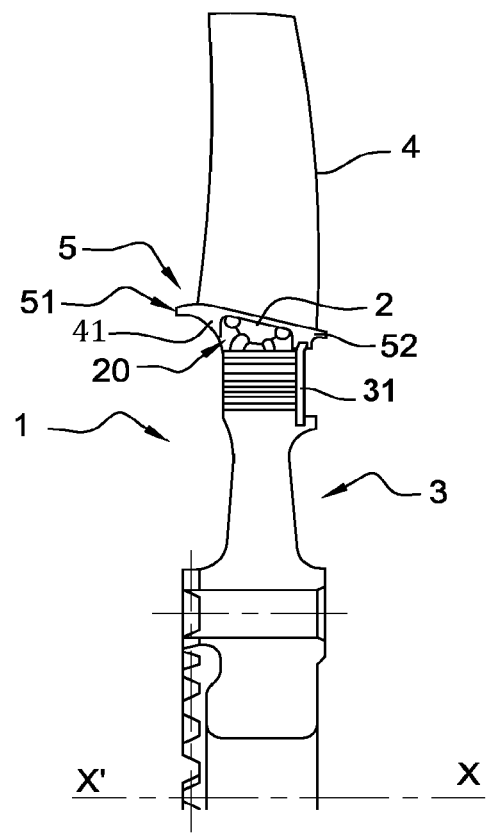
FIG. 1 is a half schematic longitudinal cross-sectional view of an example of a turbine rotor equipped with vibration dampers.

With reference to the figures, the terms "front" and "rear" refer to the "upstream" and "downstream" elements with respect to the direction defined by the central axis of rotation X'X of FIG. 1, which is the longitudinal axis of a turbomachine.

FIG. 1 illustrates, in general, the cross-sectional view of a turbomachine turbine wheel 1, this wheel 1 incorporating vibration dampers 2. The wheel 1 has a cyclic repeatability along the turbine axis X'X and comprises a central disk 3 on which the vanes 4 are mounted at the periphery. Each vane 4 comprises a blade connected by a platform 5 to a root, which is here of the fir tree type and is inserted by fitting into a socket in the periphery of the disk 3, the shape of which is complementary to that of the root.

Brake pads 31 of the vanes are inserted to lock the roots in their sockets. These pads can advantageously be replaced, according to the architecture, by other axial braking systems such as brake wires, rivets, rods, shrouds or equivalent.

Each vibration damper 2 is integrated in a recess 20 bounded by a platform 5, two adjacent vane root supports 41 (the supports being the radially outer portions of the roots) and a rear pad 31. The platform 5 has a profile forming at the axial end front and rear axial locking reinforcements 51 and 52 of the vibration damper 2 in its recess.

Figure 2:
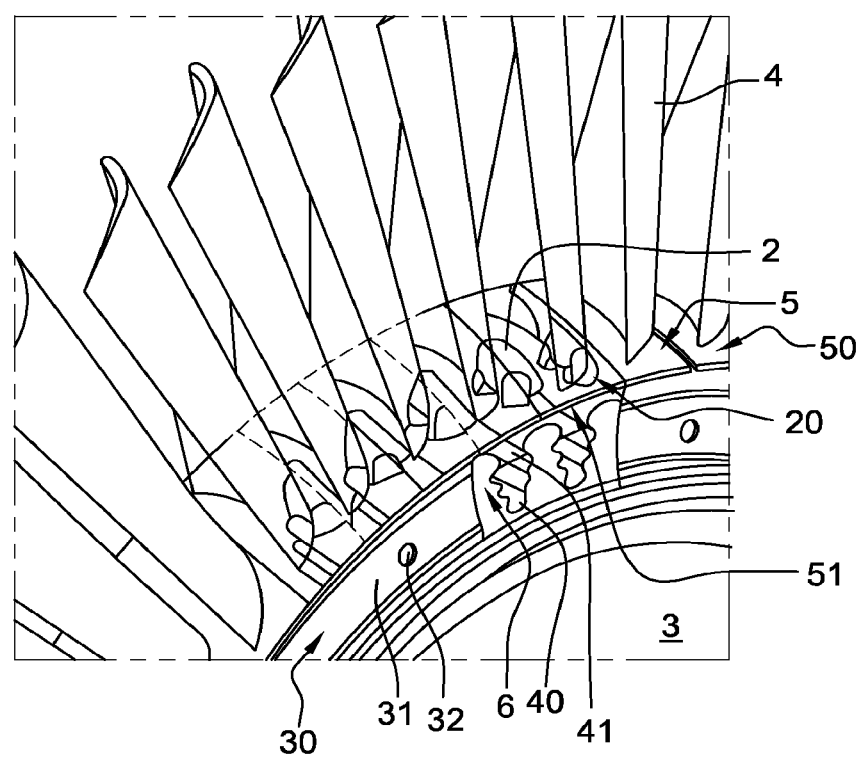
FIG. 2 is a partial schematic perspective view of a turbine rotor equipped with vibration dampers.

FIG. 2 shows a partial view of the wheel 1 in which an annular peripheral ring 30 of the disk 3 accommodates the roots 40 of the vanes 4 and the vibration dampers 2. The flanks of the ring 30 are closed by the pads 31 forming sections which are slid into grooves formed in the platforms 5 and the ring 30, in order to axially block the movement of the vane roots 40 in their sockets. The platforms 5 form a annulus 50 from which the blades of the vanes project radially outwards.

The vibration damper 2 is blocked in its recess or cavity laterally by the supports 41 of the vane roots, radially by the platform 5 and axially by the blade reinforcements 51 and 52 (see FIG. 1).

A portion of FIG. 2 is transparent and a reinforcement has been removed in order to better show the vibration dampers 2 and their recesses 20. Each recess 20 is formed under the inner faces 51 of two juxtaposed platforms 5, between two supports 41 of two roots 40 of blades 4 and an overhang or interpale 6 of the ring 30. The vibration dampers then also have a sealing function by reducing the interplatform leakage section between the juxtaposed platforms.

The vibration dampers 2 can have a degree of freedom axially along the axis X'X and a gap—for example from $\frac{1}{10}$th to a few tenths of a millimetre—between the platform 5 and the interpale 6.

FIGS. 3 and 4 show very schematically a vibration damper 100 according to the invention. This vibration damper essentially comprises two portions: a first structural portion 102 configured to be in contact with the platform of a vane in the above example, and a second mass portion 104 configured to carry out a function of damping these vibrations. The first portion 102 is in the form of a sealed internal cavity box 106 and the second portion is in the form of a powder contained in this cavity 106.

The vibration damper 100 has a general parallelepiped shape in the example shown. This shape is imposed by the box, which therefore has a general parallelepiped shape. The box comprises relatively thin walls, which are obtained by melting a metal powder, as will be described in more detail in the following. Naturally, the shape of the vibration damper and its box depends on the mounting environment. In the particular case mentioned above where the vibration damper is mounted in a recess located under vane platforms, the vibration damper is configured to be inserted into this recess and to come into operation, by one of its walls, into contact with platforms of two adjacent vanes, in order to dampen their vibrations.

The cavity 106 is partially or completely filled with the powder, which is the same powder used to produce the walls of the box. This is made possible by the way the box is manufactured by additive manufacturing.

FIG. 5 shows a machine for manufacturing a vibration damper 100 by additive manufacturing and in particular by selective fusion of powder layers by means of a high-energy beam.

The machine comprises a feed tray 170 containing the metal powder, a roller 130 for transferring this powder from this tray 170 and spreading a first layer 110 of this powder on a construction support 180 (this may be a solid support, a portion of another part or a support grid used to facilitate the construction of certain parts).

The machine also comprises a recycling tray 140 for recovering a small portion of the used powder (especially unmelted or unsintered powder) and most of the excess powder, after spreading the powder layer on the construction support 180. Thus, most of the powder in the recycling tray is new powder. Also, this recycling tray 140 is commonly referred to by the profession as an overflow tray or ashtray.

This machine also comprises a generator 190 for laser beam 195, and a control system 150 that can direct this beam 195 onto any area of the construction support 180 in order to scan any area of a powder layer. The shaping of the laser beam and the variation of its diameter on the focal plane are done respectively by means of a beam expander 152 and a focusing system 154, the whole constituting the optical system.

This machine is capable of applying a method similar to direct metal deposition (DMD) to a powder and can use any high energy beam in place of the laser beam 195, as long as the beam is sufficiently energetic to either melt or form necks or bridges between the powder particles and a portion of the material on which the particles rest.

The roller 130 can be replaced by another suitable application system, such as a reel (or hopper) combined with a scraper blade, knife or brush, which can transfer and spread the powder in layers.

The control system 150 comprises for example at least one orientable mirror 155 on which the laser beam 195 is reflected before reaching a powder layer, each point of the surface of which is always located at the same height in relation to the focusing lens contained in the focusing system 154, the angular position of this mirror 155 being controlled by a galvanometric head so that the laser beam scans at least one region of the first powder layer, and thus follows a pre-established part profile.

The machine works as follows. With the aid of the roller 130, a first powder layer 110 of a material is applied to the construction support 180, this powder is transferred from a feed tray 170 during a forward movement of the roller 130 and is then scraped off, and possibly lightly compacted, during one (or more) return movements of the roller 130. The excess powder is recovered in the recycling tray 140. A region of this first powder layer 110 is brought to a temperature higher than the melting temperature of this powder (liquidus temperature) by scanning with the laser beam 195. The galvanometric head is controlled according to the information contained in the database of the computer tool used for the computer-aided design and manufacture of the part to be manufactured. In this way, the powder particles 160 in this region of the first layer 110 are melted and form a first bead 115 in one piece, integral with the construction support 180, e.g. to form a bottom wall of the box. The support 180 is lowered by a height corresponding to the already defined thickness of the first layer (between 20 and 100 µm and usually 30-50 µm). The thickness of the powder layer to be fused or consolidated remains a variable value from one layer to the next, as it is highly dependent on the porosity of the powder bed and its flatness, whereas the pre-programmed displacement of the support 180 is a value that is invariable to the preset gap. A second powder layer 120 is then deposited on the first layer 110 and on this first bead 115, and then a region of the second layer 20 which is located partially or completely above this first bead 115 is heated by exposure to the laser beam 195, so that the powder particles of this region of the second layer 120 are melted, together with at least a portion of the first element 15, and form a second integral or consolidated bead 125, all of these two beads 115 and 125 forming an integral block. For this purpose, the second bead 125 is advantageously already fully bonded as soon as a portion of this second bead 125 bonds to the first element 115. This allows you to thicken the bottom wall of the box if the melting of a single powder layer is not sufficient, or to start producing the side walls of the box. This method of building the part layer by layer is then continued by adding additional powder layers to the already formed assembly. Scanning with the beam 195 makes it possible to build each layer by giving it a shape in accordance with the geometry of the part being produced. The lower layers of the part cool down more or less quickly as the upper layers of the part are built up. The last step here is to produce the top wall of the box.

Understandably, if the box is closed in a sealed manner during additive manufacturing, the internal cavity thereof should be completely filled with metal powder, especially that used in the production of the box.

In order to reduce the contamination of the part, for example, with dissolved oxygen, oxide(s) or other pollutant(s) during its manufacture layer by layer as described above, this manufacture must be carried out in a humidity controlled enclosure adapted to the method/material pair, filled with a gas which is neutral (non-reactive) with respect to the material in question, such as Nitrogen ($N_2$), Argon (Ar) or Helium (He), with or without the addition of a small quantity of hydrogen ($H_2$) known for its reducing power. A mixture of at least two of these gases may also be considered. To prevent contamination, especially by oxygen from the surrounding environment, it is customary to put this enclosure under overpressure.

Thus, according to the current prior art, selective melting or selective laser sintering makes it possible to construct with good dimensional accuracy low-polluted parts whose three-dimensional geometry can be complex.

Selective melting or selective laser sintering also preferably uses powders with a spherical morphology, which are clean (i.e. uncontaminated by residual elements from the synthesis), very fine (the size of each particle is between 1 and 100 µm and preferably between 45 and 90 µm), which makes it possible to obtain an excellent surface finish of the finished part. The powder is preferably made of a metal alloy, e.g. nickel base.

Selective melting or selective laser sintering also results in shorter production times, lower costs and lower fixed costs compared to a cast, injected or machined part.

From the particle size, density and compactness of the powder used to manufacture the box, as well as the internal volume of the box, it is possible to determine the mass of the powder contained in the box. This mass can be varied by removing a portion of the powder contained in the box. Several options are available for this purpose.

The first option is to drill an opening 108 in the box (FIG. 6—left drawing) in order to discharge a predetermined amount of powder and then close the opening 108, e.g. by welding 110, so that the box is sealed. Another option is to produce the box by additive manufacturing directly with the opening, which can then, after discharge of powder, be sealed as described above. Another option would be to produce a box as shown in FIG. 4, then drill it to discharge the powder from it before closing the discharge opening of the powder, for example by welding.

Figure 7:
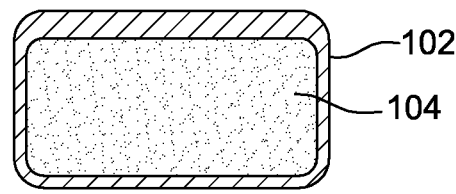
FIGS. 7 to 9 are schematic cross-sectional views similar to that of FIG. 4 and illustrate alternative embodiments of the vibration damper according to the invention.

FIG. 7 illustrates an alternative embodiment of the invention in which the box has, contrary to the embodiment of FIG. 4 which has walls of substantially identical thickness, walls with different thicknesses or localised over thicknesses. This is in particular the case of the upper wall of the box, configured to cooperate by support and friction with the platforms of two adjacent vanes, when the vibration damper is in the recess located under these platforms. The thickness of the walls of the box can be between 0.1 mm and 1 mm.

Figure 8:
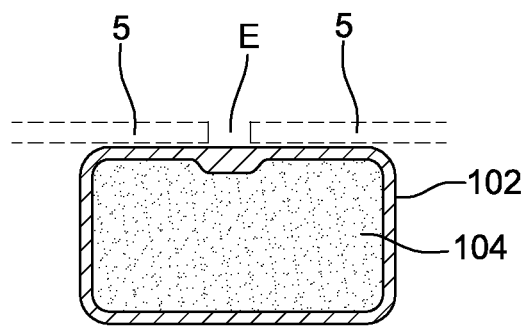

As an alternative embodiment, and as shown in FIG. 8, a localized over thickness at the right of the inter platforms space E could be provided in the upper wall of the box to prevent a creep phenomenon between the platforms during operation.

Figure 9:
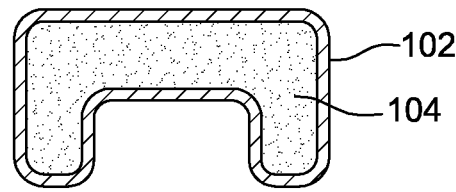

In yet another alternative embodiment shown in FIG. 9, the bottom wall of the box is raised to form a floor and automatically adjust the maximum volume of powder contained in the box at the end of the additive manufacturing method. The lower shape of the vibration damper can thus be adapted to adjust the volume of powder enclosed but also to ensure that the vibration damper remains in its recess.

Figure 10:
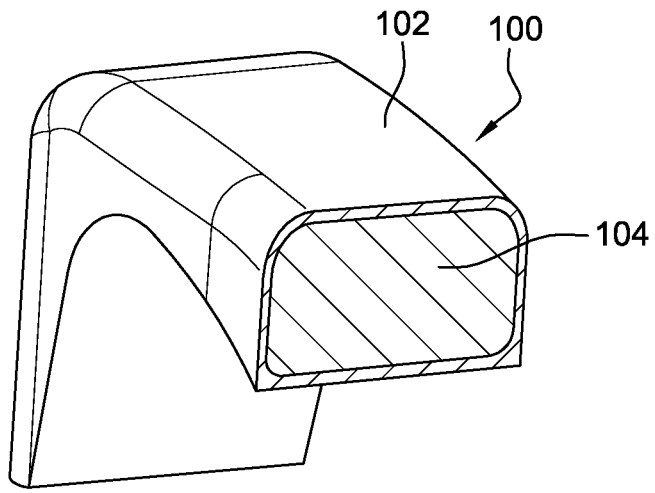
FIGS. 10 to 12 are schematic perspective and cross-sectional views of further alternative embodiments of the vibration damper according to the invention.
Figure 11:
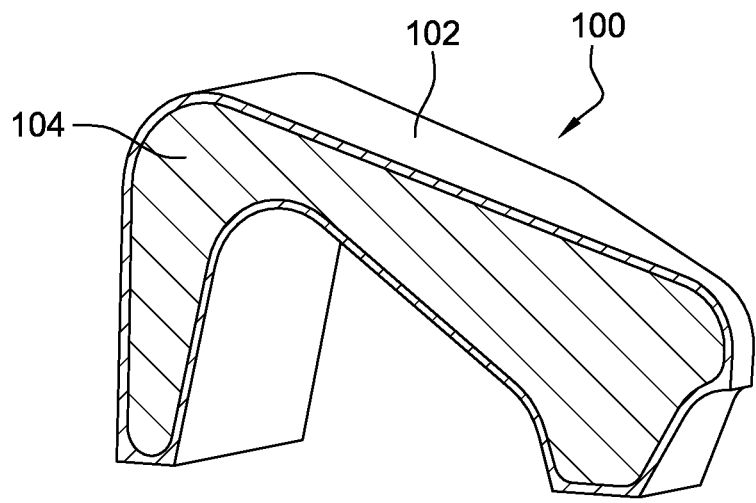

FIGS. 10 and 11 show another alternative embodiment of the vibration damper with a more complex shape of the box, here called fallen edges. The internal volume of the box can be completely filled with powder.

Figure 12:
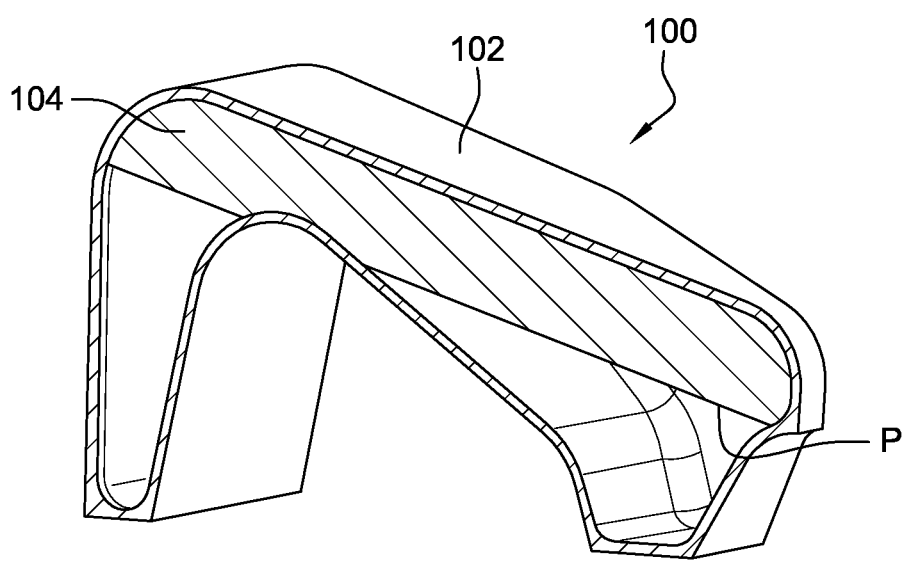

In the alternative embodiment shown in FIG. 12, only a portion of the internal volume of the box is filled with powder. The powder can be located in a lower portion of the internal volume or held in an upper portion, for example by a floor P, which is produced simultaneously with the box during additive manufacturing.

In the application described above, under the effect of the centrifugal field, with the turbine being in rotation, the vibration dampers 100 will press against the inner faces 51 of the platforms 50 to promote the damping effect in vibration by the frictional forces, in particular at resonance.

In addition, the roots of the blades can be hammer roots instead of fir roots, as the recesses of the vibration dampers are always defined by the supports of the vane roots.

It is possible to apply the invention to any set of linked and rotatably mounted parts in a turbomachine, in particular for an aircraft.

The invention claimed is:

1. A rotor for a turbomachine, comprising: a disk carrying vanes, each vane comprising a blade connected by a platform to a root, wherein for at least one of the vanes, a recess is defined between the platform and the disk, and a vibration damper is mounted in the recess, the vibration damper comprising a first structural portion configured to contact the platform, and a second mass portion configured to dampen vibrations, wherein the second mass portion is a powder and the first structural portion is a box containing the powder, wherein the recess is bounded by the platform, two adjacent vane root supports and a rear brake pad configured to be inserted to lock the root in the disk.

2. The rotor according to claim 1, wherein the box is closed in a sealed manner to prevent the powder from escaping from the box.

3. The rotor according to claim 2, wherein the powder occupies an entirety of an internal volume of the box.

4. The rotor according to claim 2, wherein the powder occupies less than an entirety of an internal volume of the box.

5. The rotor according to claim 2, wherein the box has a parallelepiped shape.

6. The rotor according to claim 2, wherein the box and the powder are made of a same metallic material.

7. The rotor according to claim 2, wherein the box is a product of melting a powder identical to that contained in the box.

8. The rotor according to claim 1, wherein the powder occupies an entirety of an internal volume of the box.

9. The rotor according to claim 8, wherein the box has a parallelepiped shape.

10. The rotor according to claim 1, wherein the powder occupies less than an entirety of an internal volume of the box.

11. The rotor according to claim 10, wherein the box has a parallelepiped shape.

12. The rotor according to claim 1, wherein the box has a parallelepiped shape.

13. The rotor according to claim 12, wherein the powder occupies an entirety of an internal volume of the box.

14. The rotor according to claim 12, wherein the powder occupies less than an entirety of an internal volume of the box.

15. The rotor according to claim 1, wherein the box and the powder are made of a same metallic material.

16. The rotor according to claim 15, wherein the powder occupies an entirety of an internal volume of the box.

17. The rotor according to claim 15, wherein the powder occupies less than an entirety of an internal volume of the box.

18. The rotor according to claim 1, wherein the box is a product of melting a powder identical to that contained in the box.

19. The rotor according to claim 1, wherein the box comprises a shape different from a parallelepiped shape, wherein the box remains in the recess when the turbomachine is stopped.

20. A turbomachine comprising the rotor according to claim 1.

21. The rotor according to claim 1, wherein the platform has a profile at an axial front end and at an axial rear end that forms front and rear axial locking reinforcements of the vibration damper in the recess.

22. The rotor according to claim 1, wherein the disk comprises an annular peripheral ring configured to accommodate the root of the vane and the vibration damper.

* * * * *